United States Patent
Ellard (10) Patent No.: US 7,933,921 B2
(45) Date of Patent: Apr. 26, 2011

(54) REFERENT-CONTROLLED LOCATION RESOLUTION OF RESOURCES IN A FEDERATED DISTRIBUTED SYSTEM

(75) Inventor: Daniel Ellard, Belmont, MA (US)

(73) Assignee: NetApp, Inc., Sunnyvale, CA (US)

( * ) Notice: Subject to any disclaimer, the term of this patent is extended or adjusted under 35 U.S.C. 154(b) by 243 days.

(21) Appl. No.: 11/605,674

(22) Filed: Nov. 29, 2006

(65) Prior Publication Data

US 2008/0126369 A1    May 29, 2008

(51) Int. Cl.
    *G06F 17/30* (2006.01)
(52) U.S. Cl. .................. 707/770; 707/782; 707/796
(58) Field of Classification Search .......... 707/773, 707/782, 770, 796
    See application file for complete search history.

(56) References Cited

U.S. PATENT DOCUMENTS

| | | | |
|---|---|---|---|
| 5,806,065 A * | 9/1998 | Lomet | 707/8 |
| 5,819,292 A | 10/1998 | Hitz et al. | |
| 6,742,035 B1 | 5/2004 | Zayas et al. | |
| 7,035,931 B1 | 4/2006 | Zayas et al. | |
| 7,107,385 B2 | 9/2006 | Rajan et al. | |
| 2001/0039585 A1 * | 11/2001 | Primak et al. | 709/228 |
| 2002/0128995 A1 | 9/2002 | Muntz et al. | |
| 2004/0030668 A1 | 2/2004 | Pawlowski et al. | |
| 2004/0205088 A1 * | 10/2004 | Toner | 707/200 |
| 2004/0210672 A1 | 10/2004 | Pulleyn et al. | |
| 2005/0192932 A1 * | 9/2005 | Kazar et al. | 707/1 |
| 2005/0246393 A1 * | 11/2005 | Coates et al. | 707/200 |
| 2005/0262102 A1 * | 11/2005 | Anderson et al. | 707/10 |
| 2007/0294388 A1 * | 12/2007 | Yu | 709/224 |

FOREIGN PATENT DOCUMENTS

| | | |
|---|---|---|
| EP | 1 480 130 A2 | 11/2004 |
| WO | WO 2008/066872 A2 | 6/2008 |

OTHER PUBLICATIONS

Harris, "Novell NetWare 6.5 Administrator's Handbook", Dec. 2, 2003, Novell Press, 3 selected pages.*
Pitoura et al. "Distributed Location Databases for Tracking Highly Mobile Objects" 2001 [retrieved on Jul. 30, 2010] The computer Journal, vol. 44, No. 2 [online]. Retrieved from the Internet;<URL:http://softsys.cs.uoi.gr/dbglobe/publications/pitfud.pdf> 17 Pages.*
Van Steen et al. "Algorithmic Design of the Globe Wide-Area Location Service" 1998 [retrieved on Jul. 30, 2010] The Computer Journal, vol. 41, No. 5 [online[. Retrieved from the Internet:<URL:http://www.cs.vu.nl/pub/papers/globe/compjournal.98.pdf> 14 Pages.*

(Continued)

*Primary Examiner* — Shahid A Alam
*Assistant Examiner* — James E Richardson
(74) *Attorney, Agent, or Firm* — Cesari and McKenna, LLP (57) ABSTRACT

When receiving a client data access request directed to a first data container serviced by a first federation member, data of the first requested data container may be used to resolve a context identifier and identify a volume location database (VLDB) associated with a second federation member servicing a second data container. A look up request may then be sent to the VLDB to identify one or more locations of the second data container. The client's original data access request illustratively may then be responded to with the identified one or more locations of the second data container.

38 Claims, 5 Drawing Sheets

OTHER PUBLICATIONS

Braam, Peter J., "The Coda Distributed File System," Linux Journal, vol. 1998, No. 50, 1998, XP002480249, ISSN: 1075-3583, Retrieved from the Internet: <http://delivery.acm.org/10.1145/330000/327403/a6-braam.html?key1=327403&key2=0251480121&coll=GUIDE&dl=GUIDE&CFID=5601694&CFTOKEN=91730823>, Retrieved on May 15, 2008.

"Notification of Transmittal of the International Search Report and the Written Opinion of the International Searching Authority, or the Declaration," International Filing Date: Nov. 29, 2007, International Application No. PCT/US2007/024541, Applicant: Network Applicance, Inc., Date of Mailing: May 29, 2008, pp. 1-13.

Kazar et al., "Enabling a Clustered Namespace With Redirection", U.S. Appl. No. 11/499,493, filed Aug. 4, 2006, 43 pages.

Howard et al., "Scale and Performance in a Distributed File System", ACM Transactions on Computer Systems, 6(1), Feb. 1988, pp. 51-81.

Shepler et al., "Network File System (NFS) version 4 Protocol", Request for Comments (RFC) 3530, Network Working Group, Apr. 2003, 275 pages.

* cited by examiner

REFERENT-CONTROLLED LOCATION RESOLUTION OF RESOURCES IN A FEDERATED DISTRIBUTED SYSTEM

FIELD OF THE INVENTION

The present invention relates to federations of storage systems and, in particular, to location resolution of an object or service within a federated storage system.

BACKGROUND OF THE INVENTION

A storage system is a computer that provides storage service relating to the organization of information on persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The storage system may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the storage system. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages to the file system over the network. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server. When used within a SAN environment, the storage system may be embodied as a storage appliance that manages data access to a set of disks using one or more block-based protocols, such as FCP.

One example of a SAN arrangement, including a storage system suitable for use in the SAN, is described in United States Patent Publication No. 2004/0030668 A1, entitled MULTI-PROTOCOL STORAGE APPLIANCE THAT PROVIDES INTEGRATED SUPPORT FOR FILE AND BLOCK ACCESS PROTOCOLS by Brian Pawlowski et al, published on Feb. 12, 2004.

Storage systems may be arranged in a distributed environment to enable the creation of distributed file systems that cooperate to provide load balancing, disaster recovery, etc. Such storage systems may further provide a unified hierarchical namespace to enable a plurality of independent file systems to be "viewed" by a client as a single entity.

In distributed storage systems, it is often desirable to track and identify the location of a file or other data container among the various storage system members because e.g., a data container on a first storage system contains an indirection construct or "junction" that identifies that a portion of the data container is stored on another storage system. A junction may comprise an indirection construct that identifies that data is located in a location remote from the junction. In such cases, the client is required to reliably resolve the location of the data in order to request access thereto. Such location resolution may involve heterogeneous storage system architectures, e.g., the two storage systems may utilize differing vendors and/or file system implementations.

One example of a distributed storage system is the Andrew File System (AFS) that utilizes a plurality of independent storage servers to implement a plurality of AFS cells. An AFS cell is a set of one or more servers, sharing a common administration, that together implement a specific sub-tree of the AFS namespace. AFS and its architecture are further described in *Scale and Performance in a Distributed File System, ACM Transactions on Computer Systems,* 6(1):51-81, February 1988. A noted disadvantage of the AFS architecture is that the location resolution system is not fully scalable. Within an AFS environment, each AFS cell maintains information in the form of, e.g., a file, that contains a mapping between all of the AFS cell names and the location for the volume location databases (VLDBs) for each cell. This information may not be updated regularly as updates rely upon system administrators of other cells to forward appropriate information relating to modifications to each cell within a federation. For example, should a VLDB be added, removed and/or migrated from one location to another within a cell, the system administrator for that cell is required to provide the new location information to all other cells within the AFS federation. As the location information may rapidly change, each individual cell's information relating to other cell's VLDB(s) may be constantly "stale" (out of date), thereby causing error conditions due to incorrect location resolutions.

Another example of a distributed storage system is the Distributed File System (DFS), described in U.S. Pat. No. 6,742,035, entitled DIRECTORY-BASED VOLUME LOCATION SERVICE FOR A DISTRIBUTED FILE SYSTEM, by Edward Zayas, et al. A noted disadvantage DFS arises in that the referrer (i.e., the computer attempting to access a resource) is linked into a given VLDB, thereby potentially exposing location information to a broader range of people. Another noted disadvantage is that when the location of a volume changes, the VLDBs for all of the servers that host junctions that refer to that volume must be updated. This adds to the burden of keeping track of all of the referring VLDBs, and requires that each VLDB trust information provided is by servers in a different administrative cell.

SUMMARY OF THE INVENTION

The present invention overcomes the disadvantages of the prior art by providing a system and method for referent-controlled location resolution of resources, such as data containers, served by storage systems of a federated distributed system. As used herein, referent-controlled location resolution denotes cooperation among a federation of heterogeneous and/or geographically distributed storage systems to provide a unified and global namespace for clients to access the data containers such as files, directories, volumes, etc. To that end, when a client makes a request, of a first storage system of the federation (i.e. a first federation member), to access a data container, the first storage system of the federation determines whether the requested data of the data container is locally stored, i.e., all requested data is stored in a local data container at the storage system. If so, the first storage system services the request. If the requested data is not locally stored, then a junction exists in the local data container that references a second data container serviced by a second storage system of a second federation member. According to the invention, the first storage system identifies the appropriate context identifier (CID) associated with the junction, wherein the CID identifies a volume location database (VLDB) that contains location information related to the second data container.

The first storage system then resolves the CID to the identified VLDB using, e.g., a name service and sends a lookup request to the identified VLDB. The lookup request is processed by the VLDB, which responds with the locations of the requested data container served by the second storage system. The storage system member then responds to the client's access request with a message indicating the actual location of the requested second data container. The client then sends a data access request directed to the second data container, which is served by the second storage system of the second federation member.

BRIEF DESCRIPTION OF THE DRAWINGS

The above and further advantages of invention may be understood by referring to the following description in conjunction with the accompanying drawings in which like reference numerals indicate identical or functionally similar elements.

DETAILED DESCRIPTION OF ILLUSTRATIVE EMBODIMENTS

A. Federated Storage System Environment

Figure 1:
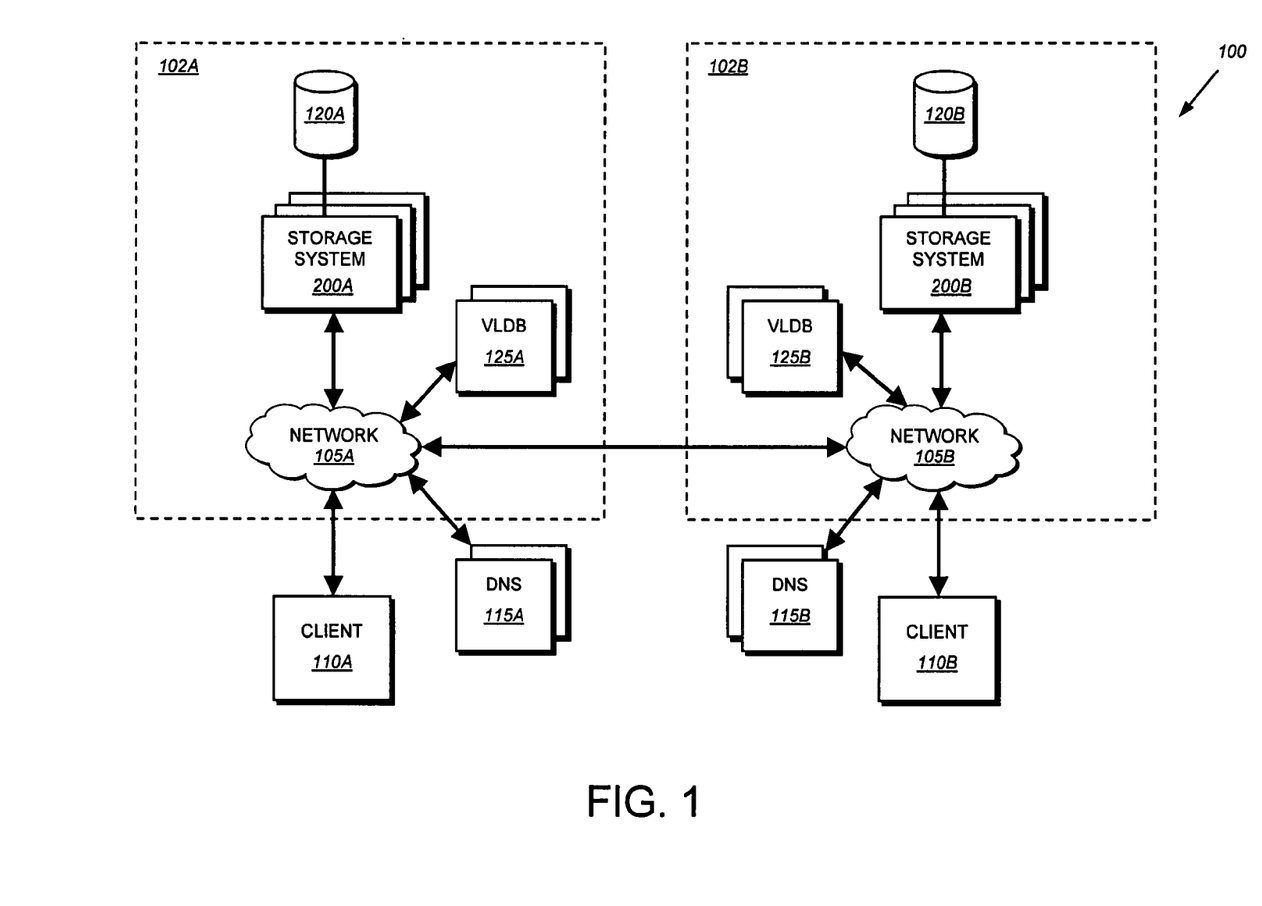
FIG. 1 is a schematic block diagram of an exemplary pair of federated storage systems in accordance with an illustrative embodiment of the present invention.

FIG. 1 is a schematic block diagram of a federated storage system environment 100 that may be advantageously used with the present invention. As used herein the term federation means a plurality of storage systems that cooperate to provide a unified namespace amongst independent file systems, or other data container structures, implemented by the storage systems. Federated storage systems are typically loosely coupled together based on a predetermined minimum trust level and may be geographically separate and/or utilize heterogeneous hardware/software architectures. It should be noted that while FIG. 1 shows and describes an exemplary two member 102A,B environment 100, the principles of the present invention may be utilized with any number of federation members. As such, a two-member federation environment should be taken as exemplary only.

Illustratively, a federation member 102 includes a network 105 operatively interconnecting with one or more storage systems 200. The network may comprise a local area network (LAN), wide area network (WAN), such as the well-known Internet, a virtual private network (VPN), etc. Furthermore, the networks 105A,B of the federation members 102A,B are illustratively interconnected. For example, each network 105A, B may be a LAN associated with a particular geographic location of a company. In such an example, each LAN may also be interconnected via, e.g., an intra-company WAN. In alternate embodiments of the present invention, networks 105A,B may comprise the same network. Each storage system 200 is operatively interconnected with one or more storage devices 120, such as disks.

The clients 110 may be general-purpose computers configured to interact with the storage system 200 in accordance with a client/server model of information delivery. That is, each client may request the services of the storage system, and the storage system may return the results of the services requested by the client, by exchanging packets over the network 105. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

A domain name service (DNS) server 115 implements DNS lookup operations for the federation. It should be noted that federation members may utilize the services of a DNS server 115 that is not part of the federation member, e.g., a DNS server 115B may be utilized by clients and storage systems (generally, computers) that are part of federation member 102A. As described further below, each computer of federation member 102 illustratively utilizes DNS name mappings to enable the resolution of a context identifier (CID) into an address for a volume location database (VLDB) server 125 used to identify the location of a requested data container. It should be noted that the use of DNS is exemplary only and that alternate techniques for address resolution may be utilized. As such, the description of DNS should be taken as illustrative only.

B. Storage System

Figure 2:
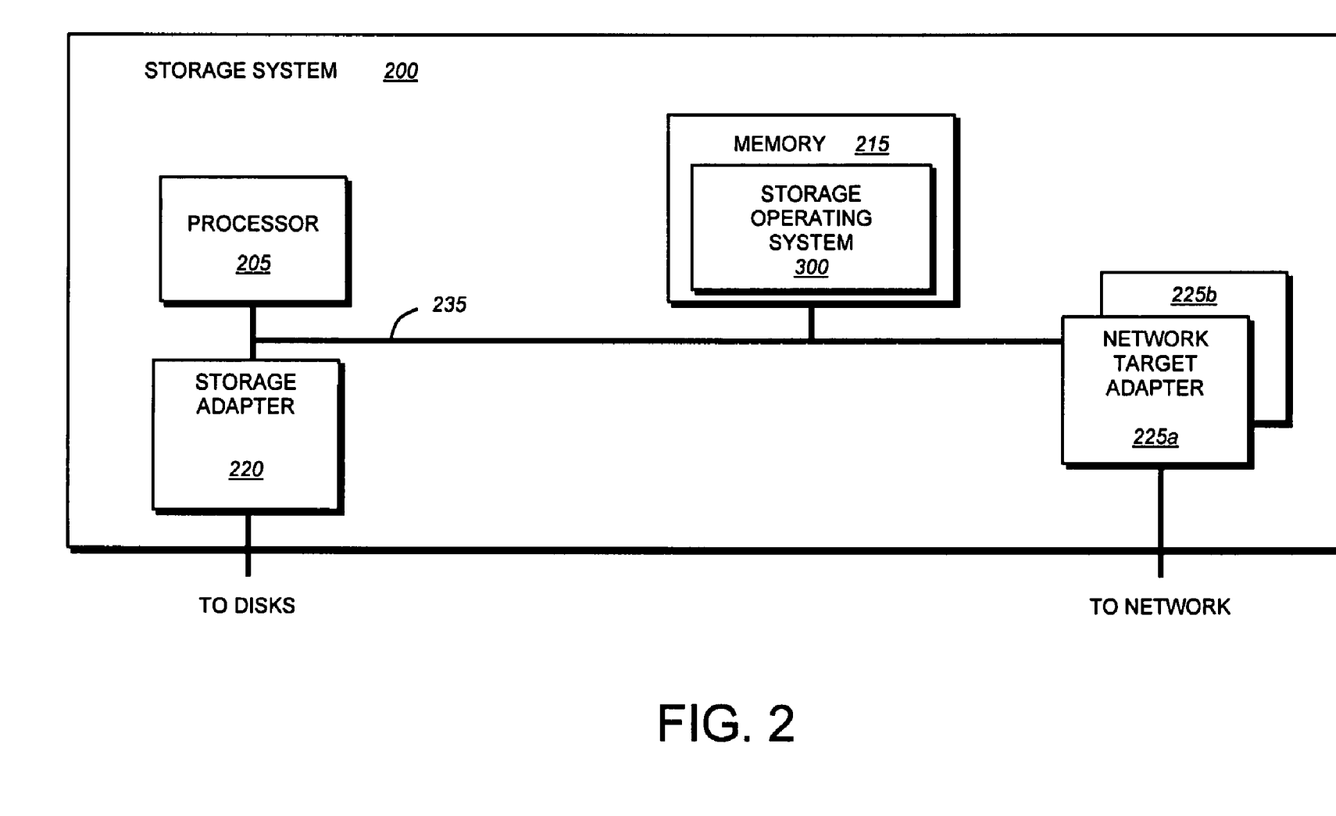
FIG. 2 is a schematic block diagram of an exemplary storage system in accordance with an illustrative embodiment of the present invention.

FIG. 2 is a schematic block diagram of an exemplary storage system 200 as used in federation environment 100 and configured to provide storage service relating to the organization of information on storage devices, such as disks. The storage system 200 illustratively comprises a processor 205, a memory 215, a plurality of network adapters 225a, 225b and a storage adapter 220 interconnected by a system bus 235. It should be noted that in alternate embodiments, a single network adapter 225 may be utilized. As used herein, a storage system (or "storage appliance") is a computer having features such as simplicity of storage service management and ease of storage reconfiguration, including reusable storage space, for users (system administrators) and clients of network attached storage (NAS) and storage area networks (SAN) deployments. The storage system may provide NAS services through a file system, while the same system provides SAN services through SAN virtualization, including logical unit number (LUN) emulation. Multi-protocol storage systems are further described in the above-referenced U.S. patent application entitled MULTI-PROTOCOL STORAGE APPLIANCE THAT PROVIDES INTEGRATED SUPPORT FOR FILE AND BLOCK ACCESS PROTOCOLS. The storage system 200 also includes a storage operating system 300 that provides a virtualization function to logically organize the information as a hierarchical structure of data containers, such as directory, file and virtual disk (vdisk) storage objects on the disks.

Whereas clients of a NAS-based network environment have a storage viewpoint of files, the clients of a SAN-based network environment have a storage viewpoint of blocks or disks. To that end, the storage system 200 presents (exports) disks to SAN clients through the creation of luns or vdisk objects. A vdisk object (hereinafter "vdisk") is a special file type that is implemented by the virtualization function and translated into an emulated disk as viewed by the SAN clients. Such vdisks objects are further described in U.S. Pat. No. 7,107,385 entitled STORAGE VIRTUALIZATION BY LAYERING VIRTUAL DISK OBJECTS ON A FILE SYSTEM, by Vijayan Rajan, et al., issued on Sep. 12, 2006.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage system by, inter alia, invoking storage operations in support of the storage service implemented by the system. It will be apparent to those skilled in the art that other processing and memory means, including various computer readable media, may be used for storing and executing program instructions pertaining to the inventive system and method described herein.

The network adapters 225a and b couple the storage system to a plurality of clients over point-to-point links, wide area networks (WAN), virtual private networks (VPN) implemented over a public network (Internet) or a shared local area network (LAN) or any other acceptable networking architecture. The network adapters 225 may comprise a FC host bus adapter (HBA) having the mechanical, electrical and signaling circuitry needed to connect the storage system 200 to network 105. In addition to providing FC access, the FC HBA may offload FC network processing operations from the storage system's processor 205.

The clients may be general-purpose computers configured to execute applications over a variety of operating systems, including the UNIX® and Microsoft® Windows™ operating systems. The clients generally utilize block-based access protocols, such as the Small Computer System Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks, to attach to the storage system 200. In SCSI terminology, clients operating in a SAN environment are initiators that initiate requests and commands for data. The multi-protocol storage system is thus a target configured to respond to the requests issued by the initiators in accordance with a request/response protocol.

The storage system 200 supports various SCSI-based protocols used in SAN deployments, including SCSI encapsulated over TCP (iSCSI) and SCSI encapsulated over FC (FCP). The initiators (hereinafter clients 110) may thus request the services of the target (hereinafter storage system 200) by issuing iSCSI and/or FCP messages over the network 105 to access information stored on the disks. It will be apparent to those skilled in the art that the clients may also request the services of the integrated storage system using other block access protocols. By supporting a plurality of block access protocols, the storage system provides a unified and coherent access solution to vdisks/luns in a heterogeneous SAN environment.

The storage adapter 220 cooperates with the storage operating system 300 executing on the storage system to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 205 (or the adapter 220 itself) prior to being forwarded over the system bus 235 to the network adapters 225a and b, where the information is formatted into packets or messages and returned to the clients.

Storage of information on the storage system 200 is, in the illustrative embodiment, implemented as one or more volumes that comprise a cluster of physical disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, an implementation may include three data and one parity disk per RAID group and at least one RAID group per volume.

To facilitate access to the disks, the storage operating system 300 implements a write-anywhere file system that cooperates with novel virtualization system code to provide a function that "virtualizes" the storage space provided by disks. The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization function allows the file system to further logically organize information as vdisks on the disks, thereby providing an integrated NAS and SAN appliance approach to storage by enabling file-based (NAS) access to the files and directories, while further emulating block-based (SAN) access to the vdisks on a file-based storage platform.

A vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage system via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data associated with the emulated disk. The stream inode stores attributes that allow luns and exports to persist over, e.g., reboot operations, while also enabling management of the vdisk as a single disk object in relation to SAN clients. Vdisks are further described in the above-referenced U.S. Pat. No. 7,107,385.

C. Storage Operating System

In the illustrative embodiment, the storage operating system is the NetApp® Data ONTAP® operating system that implements a Write Anywhere File Layout (WAFL®) file system. However, it is expressly contemplated that any appropriate storage operating system, including a write in-place file system, may be enhanced for use in accordance with the inventive principles described herein. As such, where the term "Data ONTAP" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
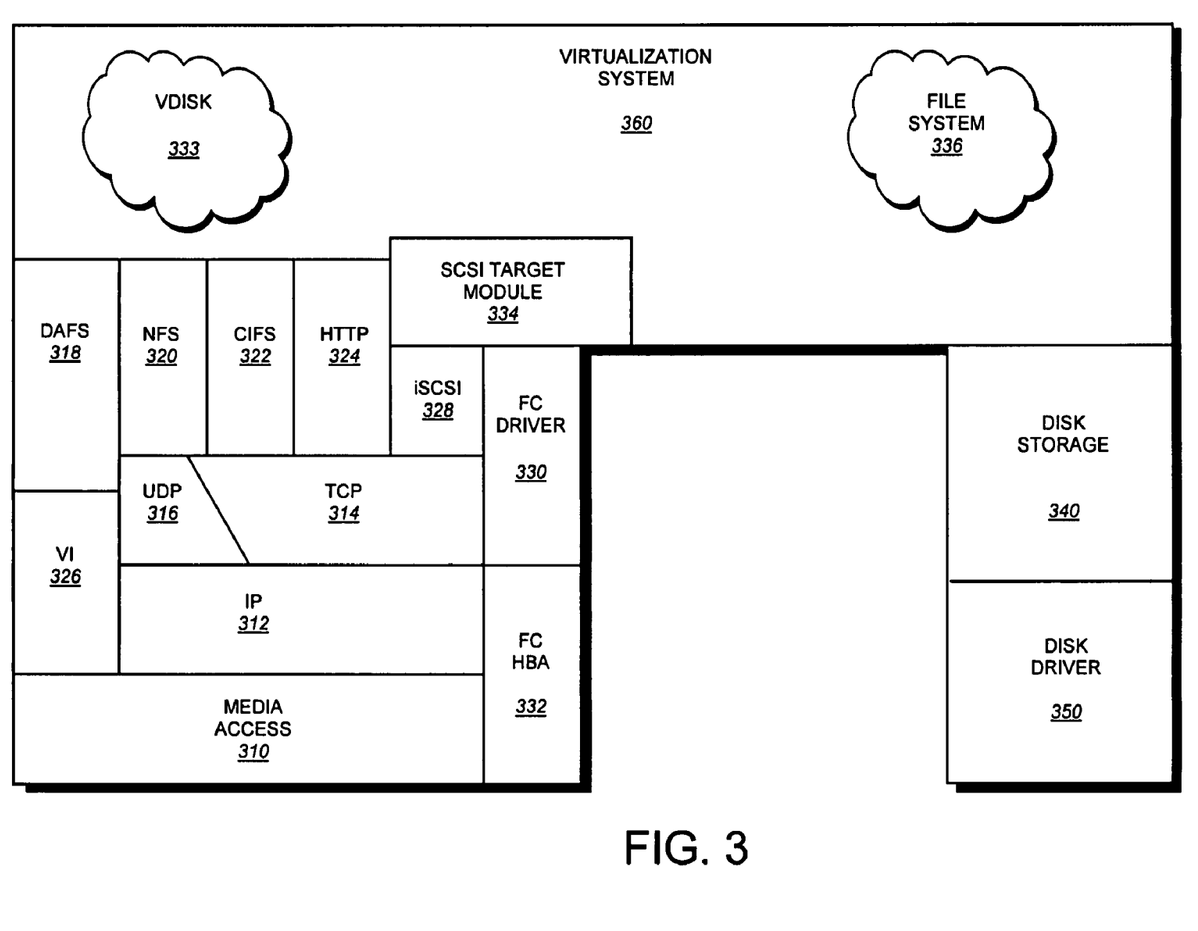
FIG. 3 is a schematic block diagram of an exemplary storage operating system for use with the storage system of FIG. 2 in accordance with an illustrative embodiment of the present invention.

FIG. 3 is a schematic block diagram of the storage operating system 300 that may be advantageously used with the present invention. The storage operating system comprises a series of software layers organized to form an integrated network protocol stack or multi-protocol engine that provides data paths for clients to access information stored on the multi-protocol storage system using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A Virtual Interface (VI) layer 326 implements the VI architecture to provide direct access transport (DAT) capabilities, such as Remote Direct Memory Access (RDMA), as required by the DAFS protocol 318.

An iSCSI driver layer 328 provides block protocol access over the TCP/IP network protocol layers, while a FC driver layer 330 operates with the FC HBA 225 to receive and transmit block access requests and responses to and from the integrated storage system. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage system. In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a virtualization system 360 that is implemented by a file system 336 interacting with virtualization software embodied as, e.g., vdisk module 333 and SCSI target mode 334. The vdisk module 333 manages SAN deployments by, among other things, implementing a comprehensive set of vdisk (lun) commands that are converted to primitive file system operations ("primitives") that interact with the file system 336 and the SCSI target module 334 to implement the vdisks.

The SCSI target module 334, in turn, initiates emulation of a disk or lun by providing a mapping procedure that translates luns into the special vdisk file types. The SCSI target module is illustratively disposed between the FC and iSCSI drivers 328, 330 and the file system 336 to thereby provide a translation layer of the virtualization system 360 between the SAN block (lun) space and the file system space, where luns are represented as vdisks. By "disposing" SAN virtualization over the file system 336, the multi-protocol storage system reverses the approaches taken by prior systems to thereby provide a single unified storage platform for essentially all storage access protocols.

The file system 336 illustratively implements the Write Anywhere File Layout (WAFL) file system having an on-disk format representation that is block-based using, e.g., 4 kilobyte (KB) blocks and using inodes to describe the files. A further description of the structure of the file system, is provided in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz, et al., issued Oct. 6, 1998, which patent is hereby incorporated by reference as though fully set forth herein.

D. Referent Controlled Location Resolution

The present invention provides a system and method for referent-controlled location resolution of resources in federated distributed system. As used herein, referent-controlled location resolution denotes cooperation among a federation of heterogeneous and/or geographically distributed storage systems to provide a unified and global namespace for clients to access the data containers such as a file, directory, volume, etc. Illustratively, the resources comprise volumes (or other data containers) serviced by a plurality of federated storage systems. The referent-controlled location resolution technique enables a federation of heterogeneous and/or geographically distributed storage systems to provide a unified and global namespace to clients. To that end, when a client requests access to a data container, such as a file, directory, volume, etc., from a storage system that is a member of a first federation, the storage system determines whether the requested data of the data container is locally stored, i.e., all requested data is stored by the storage system. If the requested data is not locally stored, i.e., a junction exists in the local volume referencing a second volume serviced by a second federation member, the first federation member identifies the appropriate context identifier (CID) associated with the junction. As noted above, a junction may comprise an indirection construct that identifies that data is located in a location remote from the junction. An illustrative form of junctions is described in U.S. patent application Ser. No. 11/499,493, entitled ENABLING A CLUSTERED NAMESPACE WITH REDIRECTION, by Michael Kazar, et al. The junction illustratively contains a remote volume locator and an object identifier. The CID identifies a VLDB that contains location information related to the desired data container.

The first federation member resolves the CID to an appropriate VLDB service and sends a lookup request to the identified VLDB associated with the second federation member. The lookup request is processed by the VLDB and the VLDB responds with the location of the requested data container within the second federation member. The first federation member then responds to the client's original access request with a message indicating the current location of the requested data container. The client then forwards a data access request to the identified second federation member requesting access to the desired data.

Figure 4:
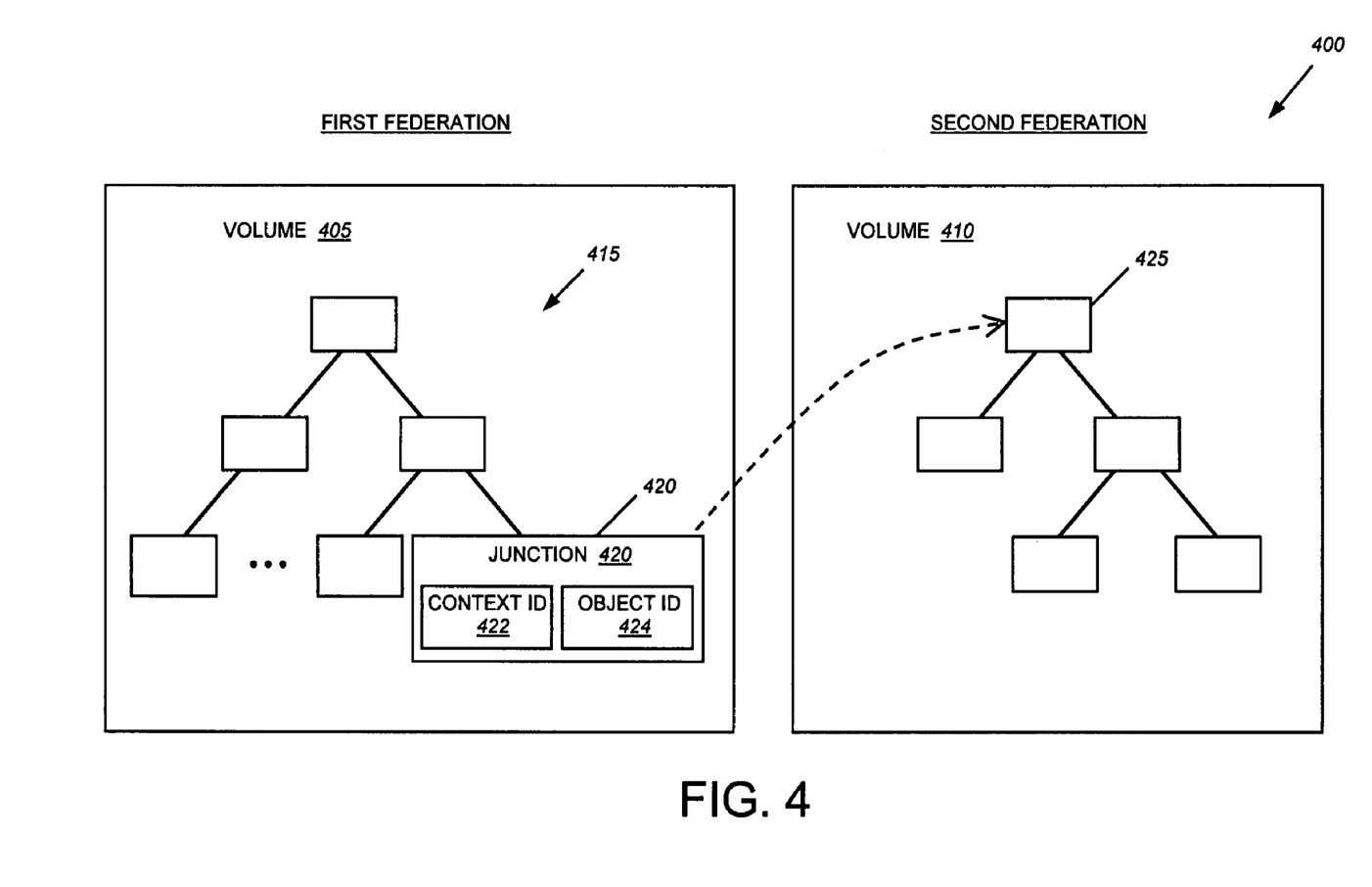
FIG. 4 is a schematic block diagram illustrating a junction within a first federation member referencing a second federation member in accordance with an illustrative embodiment of the present invention.

FIG. 4 is a schematic diagram illustrating a relationship of a data container 415, such as a file, stored within another data container, such as volume 405, of a first federation member to a file 425 in a volume 410 of a second federation member. Note that the files 415, 425 are embodied as hierarchical node tree structures. A junction exists at some level of the file 415 wherein the junction 420 signifies that lower level nodes within the hierarchical node tree of the file 415 reside in a remote location. Illustratively, a junction 420 comprises a context identifier (CID) 422 and an object identifier OID 424. It should be noted that in embodiments, a junction 420 may comprise additional and/or differing elements. The CID 422 illustratively identifies a VLDB (not shown) servicing an object identified by the OID 424. Thus, the junction contains an identifier of the VLDB that is capable of providing the location of the object identified by the OID. By associating the CID with a particular VLDB, slow changing data, (namely identifications of VLDBs) may be utilized in junctions whereas fast-changing data, such as locations of a data container within a second federation member, may be maintained within the identified VLDB. That is, identifications of VLDBs, which change rarely, may be utilized within junctions, whereas data that change much more frequently, e.g., locations of data containers within a storage system environment, are stored in the VLDBs. This prevents the need for frequent updates to junctions, while still ensuring that location information is available in a timely manner. Advantageously, the association only "publicly" exposes limited location information, i.e., the identities of VLDBs. To ensure against compromising a federation member, the publicly known VLDB server may be "hardened," (e.g. using strong cryptographic techniques) while other servers, which are not publicly known, may not need to be strengthened as much.

As noted, directory 415 includes a junction 420 that signifies that one of the items in that directory is actually a reference to file 425 within volume 410 hosted by a storage system of a second federation member. It should also be noted that FIG. 4 is shown for exemplary purposes, and as such, only includes a pair of federation members and a single junction. It should be further noted that the principles of the present invention may be utilized in environments having any number of federation members and/or any number of junctions. As such, the description of a two federation environment with a single junction should be taken as exemplary only.

Figure 5:
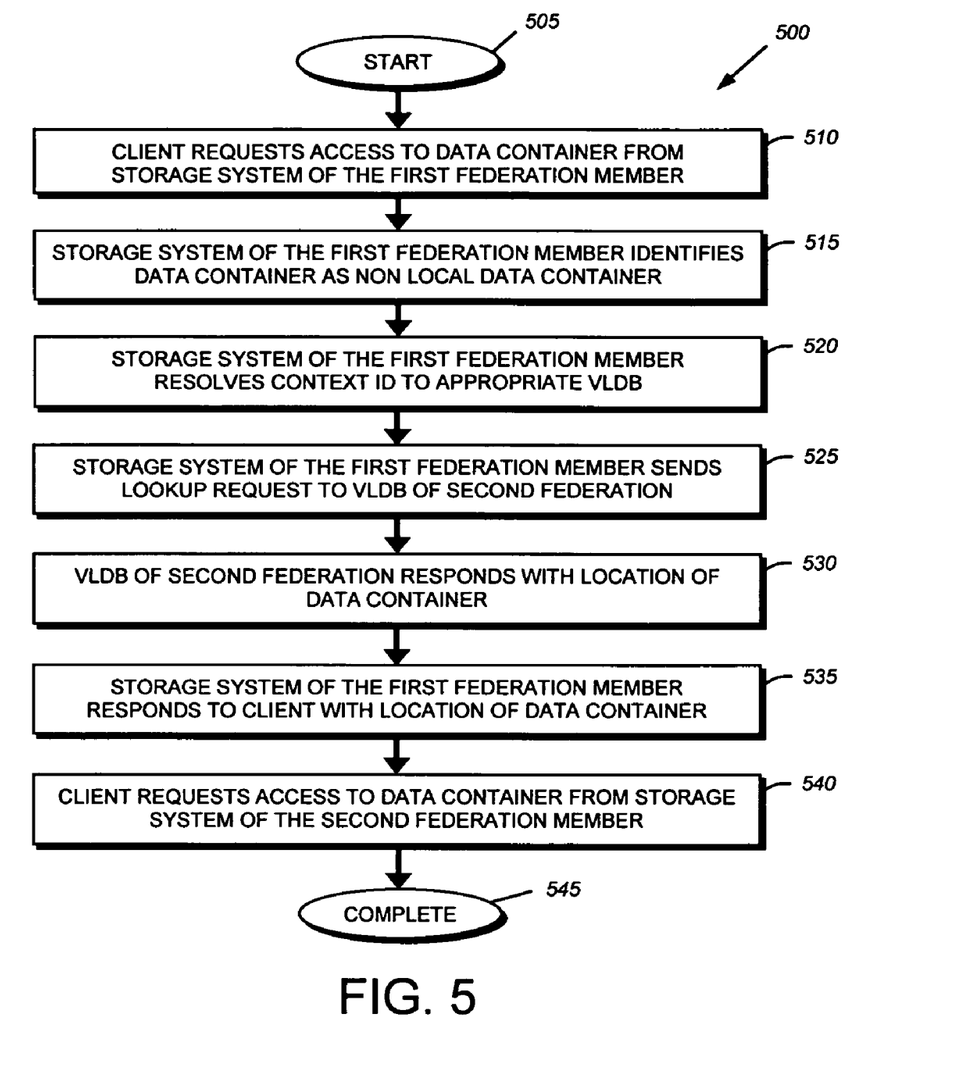
FIG. 5 is a flowchart detailing the steps of a procedure for location resolution in accordance with an illustrative embodiment of the present invention.

FIG. 5 is a flowchart detailing the steps of a procedure 500 for performing location resolution in accordance with an embodiment of the present invention. The procedure 500 begins in step 505 and continues to step 510 where a client requests access to a data container, such as a file, served by a storage system of a first federation member. Illustratively, the client request is issued in accordance with e.g., the network file system (NFS) protocol, by directing a data access request to the data container stored within a volume of the storage system that is part of the first federation member. It should be noted that while the use of NFS is described, the principles of the present invention may be utilized with any suitable data access protocol including, e.g., CIFS, etc. While processing the data access request, the storage system determines that the requested data container is a non-local data container in step 515. The storage system may identify that the requested data container is a non-local data container by, e.g., encountering a junction while navigating a path to the requested container. Upon encountering the junction, the storage system may determine that the junction references a data container serviced locally, e.g., within another volume serviced by the storage system. If the junction identifies a local data container, the storage system may retrieve the data and process the data access request.

However, if the storage system identifies that the data container is a nonlocal data container, the storage system resolves the CID of the junction to identify the appropriate VLDB servicing the requested data container in step 520. Thus, in the present invention, the referent (and not the referrer) is linked with the appropriate VLDB to resolve names. In the illustrative embodiment, the storage system may utilize the CID with a DNS server of the first federation member to map the CID to a network address associated with the VLDB capable of identifying the location of the requested data container. Illustratively, the storage system federation may adopt a naming convention employed by individual federation members to identify the appropriate VLDB using the DNS. For example, if the CID associated with a junction is XYZ, the name to be resolved may be defined as VLDB.XYZ.COM. By utilizing conventional DNS lookup operations, the DNS servers may resolve the name VLDB.XYZ.COM to a network address. It should be noted that the above-described naming convention is for illustrative purposes and that the principles of the present invention may be utilized with any naming convention.

The storage system of the first federation member then sends a lookup request to the VLDB of the second federation member in step 525. This lookup operation is directed to the identified VLDB and requests the current actual location of the requested data container. The VLDB of the second federation responds with the location of the data container in step 530. However, should the VLDB be unable to provide the current location of the requested data container, the VLDB may perform one or more additional lookup operations to other VLDB servers known to it, thereby attempting to identify an appropriate VLDB service with knowledge of the requested data container.

The storage system of the first federation member then responds to the client with the location of the data container in step 535. In the illustrative embodiment, the response involves, e.g., an NFS version 4 (NFSv4) response code signifying that the data has been moved and identifying the current location of the data as the new location of the data. For example, the NFSv4 operation may update the fs_locations attributes associated with an NFS file handle. The fs_locations attribute is further described in RFC 3530 entitled *Network File System (NFS) Version 4 Protocol*, dated April 2003, the contents of which are hereby incorporated by reference. Note that the present invention may overload the use of the NFSv4 fs_locations attributes as the requested data container may not been physically present within the first federation member. However, overloading of the NFSv4 operation enables conventional NFS clients, i.e., clients that are unmodified, to use the federated storage systems. It should be further noted that the use of NFS fs_locations attributes is exemplary only and that the storage system may identify the location of the requested data container using other techniques, including, e.g., out of band messaging using a remote procedure call (RPC), etc.

Once the client has received information identifying the location of the requested data container, the client then requests access to the data container in the second federation member in step 540 before the procedure completes in step 545. Typically, the second request to the second federation member is done transparently to upper level services and/or applications executing on the client. In the example of an NFS client, the client assumes that the data has been migrated based upon the information received from the first federation member and subsequently transmits the appropriate data access requests to the "new" location of the requested data container.

The foregoing description has been directed to specific embodiments of this invention. It will be apparent, however, that other variations and modifications may be made to the described embodiments, with the attainment of some or all of their advantages. The procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for location resolution, comprising:
   receiving, from a client, a data access request directed to a local data container serviced by a first federation member of a distributed storage system;
   identifying an indirection construct in the local data container that references a next data container serviced by a second federation member of the distributed storage system, the indirection construct comprising a context identifier that identifies a volume location database (VLDB) comprising a location of the next data container;
   resolving, by the first federation member, the context identifier of the indirection construct to a network address using a name service to identify the VLDB;
   sending a lookup request to the VLDB after the context identifier is resolved to identify the location of the next data container; and
   responding to the data access request of the client with the location of the next data container.

2. The method of claim 1 further comprising:
   forwarding the data access request to the second federation member servicing the next data container.

3. The method of claim 1 wherein the context identifier is resolved using a name service server that is not part of the first federation member.

4. The method of claim 1 wherein the name service is a domain name service.

5. The method of claim 1 wherein the network address is an Internet Protocol address.

6. The method of claim 1 wherein the indirection construct further comprises an object identifier.

7. The method of claim 6 further comprising:
   identifying, by the object identifier, data stored in the next data container requested by the client.

8. The method of claim 1 further comprising:
   signifying to the client that data requested by the data access request has moved from the local data container serviced by the first federation member to the next data container serviced by the second federation member.

9. The method of claim 1 wherein the indirection construct comprises a junction.

10. The method of claim 1 further comprising:
    transmitting, after identifying the location of the next data container, the data access request to the next data container.

11. A system configured to perform location resolution among first and second federated storage systems, comprising:
    the first federated storage system configured to operatively interconnected with a client and further configured to receive a data access request directed to a first data container serviced by the first federated storage system, at least a portion of data of the first data container referencing a second data container serviced by the second federated storage system; and
    wherein the first federated storage system is configured to identify a junction in the first data container comprising a context identifier, and further configured to resolve the context identifier to a network address using a name service to identify a volume location database (VLDB) using the data of the first data container, and further configured to send a lookup request to the VLDB after the context identifier is resolved to identify the location of the second data container, the VLDB configured to respond to the lookup request with the location of the second data container serviced by the second federated storage system.

12. The system of claim 11 wherein the junction further comprises an object identifier.

13. The system of claim 11 wherein the the first data container comprises a file.

14. The system of claim 11 wherein the context identifier further comprises an object identifier.

15. The system of claim 11 wherein the name service is a domain name service.

16. The system of claim 11 wherein the VLDB is further configured to forward, transparently, the data access request to the second data container.

17. The system of claim 11 wherein the first federated storage system is further configured to respond to the client with the location of the second data container.

18. The system of claim 17 wherein the first federated storage system is further configured to signify to the client that at least some of the data of the first data container has moved to the location of the second data container.

19. The system of claim 11 wherein the VLDB is configured to obtain the location of the second data container from a second VLDB.

20. The system of claim 11 wherein the second federated storage system is configured to receive a second data access request from the client to access the second data container.

21. The system of claim 11 wherein the first federated storage system is further configured to use a name service server that is not part of the first federation storage system.

22. The system of claim 21 wherein the name service server is a domain name service (DNS) server.

23. The system of claim 11 wherein the first data container comprises a directory.

24. A computer system for location resolution among a plurality of federated storage systems, comprising:
    means for receiving a data access request of a client directed to a first data container serviced by a first federation member of the plurality of federated storage systems;
    means for identifying an indirection construct in the first data container that references a second data container serviced by a second federation member of the plurality of federated storage systems, the indirection construct comprising a context identifier that identifies a volume location database (VLDB) comprising a location of the second data container;
    means for resolving, by the first federation member, the context identifier of the indirection construct to a network address using a name service to identify the VLDB;
    means for sending a lookup request to the VLDB after the context identifier is resolved to identify the location of the second data container; and
    means for responding to the data access request of the client with the location of the second data container.

25. A computer readable storage medium containing executable program instructions executed by a processor, comprising:
    program instructions that receive a data access request of a client directed to a local data container serviced by a first federation member of a distributed system;
    program instructions that identify an indirection construct in the local data container that references a next data container serviced by a second federation member of the distributed system, the indirection construct comprising a context identifier that identifies a volume location database (VLDB) comprising a location of the next data container;
    program instructions that resolve, by the first federation member, the context identifier of the indirection construct to a network address using a name service to identify the VLDB;
    program instructions that send a lookup request to the VLDB after the context identifier is resolved to identify the location of the next data container; and
    program instructions that respond to the data access request of the client with the location of the next data container.

26. A method for location resolution among a plurality of storage systems, comprising:
    receiving, from a client, a data access request directed to a first data container serviced by a first storage system of the plurality of storage systems;
    determining that an indirection construct is stored in the first data container that references a second data container serviced by a second storage system, of the plurality of storage systems, the indirection construct comprising a context identifier resolved to a network address using a name service that identifies a volume location database (VLDB) comprising a location of the second data container;
    identifying the VLDB by the first storage system resolving the context identifier of the indirection construct;
    processing, by the VLDB, a lookup request after the context identifier is resolved to identify the location of the second data container; and
    responding to the lookup request with the location of the second data container.

27. The method of claim 26 further comprising:
    forwarding, transparently, the data access request to the second data container.

28. The method of claim 26 wherein the indirection construct further comprises an object identifier.

29. The method of claim 26 wherein the context identifier is resolved using a name service server that is not part of the first storage system.

30. The method of claim 26 further comprising:
    determining the first data container is local to the first storage system;
    determining that the first data container references the second data container, wherein the second data container is non-local to the first storage system; and
    responding to the client with the location of the second data container.

31. A computer readable storage medium containing executable program instructions executed by a processor, comprising:
    program instructions that receive, from a client, a data access request directed to a first data container serviced by a first storage system;
    program instructions that determine that an indirection construct is stored in the first data container that references a second data container serviced by a second storage system, the indirection construct comprising a context identifier resolved to a network address using a name service that identifies a volume location database (VLDB) comprising a location of the second data container;
    program instructions that identify the VLDB by the first storage system resolving the context identifier of the indirection construct;
    program instructions that process, by the VLDB, a lookup request after the context identifier is resolved to identify the location of the second data container; and
    program instructions that respond to the lookup request with the location of the second data container.

32. A system configured to perform location resolution among a plurality of storage systems, comprising:
    a first storage system of the plurality of storage systems configured to service a first data container operatively connected to the first storage system , the first storage system further configured to receive a data access request directed to the first data container;
    a processor operatively connected with the first storage system configured to execute a storage operating system, the storage operating system configured to determine that the first data container comprises an indirection construct, the indirection construct comprising a context identifier resolved to a network address using a name service that identifies a volume location database (VLDB) comprising a location of a second data container serviced by a second storage system of the plurality of storage systems;

the storage operating system of the first storage system further configured to identify the VLDB by resolving the context identifier; and the VLDB configured to process a lookup request after the context identifier is resolved to identify the location of the second data container, the VLDB further configured to respond to the lookup request with the location of the second data container serviced by the second storage system.

33. The system of claim 32 wherein the indirection construct further comprises an object identifier.

34. The system of claim 32 wherein the context identifier is resolved using a name service server that is not part of the first storage system.

35. The system of claim 32 wherein the name service is a domain name service (DNS).

36. A method for location resolution, comprising:

receiving a data access request of a client directed to a data container serviced by a federation member of a distributed computer system;

identifying an indirection construct in the data container that references a next data container, the indirection construct comprising data that identifies a volume location database (VLDB) comprising a location of the next data container;

resolving the data of the indirection construct to a network address using a name service to identify the VLDB, wherein the federation member resolves the data;

sending a lookup request to the VLDB after the data is resolved to identify the location of the next data container; and responding to the data access request of the client with the location of the next data container.

37. The method of claim 36 wherein the data resolved by the federation member comprises a context identifier.

38. A method for operating a computer data storage system, comprising:

maintaining a global namespace for a federation of computers of the computer data storage system, each respective computer maintaining data storage in one or more storage devices local to each respective computer, each respective computer maintaining one or more databases, each database identified by a database identifier (ID);

receiving, from a client, a data access request directed to a first data container serviced by a first federation computer of the federation of computers, the first data container comprising a junction that comprises a particular database ID which identifies a particular database serviced by a second federation computer of the federation of computers, the particular database comprising a location of a second data container serviced by the second federation computer that stores data requested by the data access request;

resolving by the first federation computer, in response to the particular database ID, a network address of the particular database using a name service; and transmitting to the client the network address of the particular database after the network address is resolved.

* * * * *

UNITED STATES PATENT AND TRADEMARK OFFICE
CERTIFICATE OF CORRECTION

| | | |
|---|---|---|
| PATENT NO. | : 7,933,921 B2 | Page 1 of 1 |
| APPLICATION NO. | : 11/605674 | |
| DATED | : April 26, 2011 | |
| INVENTOR(S) | : Daniel Ellard | |

It is certified that error appears in the above-identified patent and that said Letters Patent is hereby corrected as shown below:

Col. 12, line 54, claim 13 should read --
The system of claim 11 wherein the first data con- Col. 14, line 58, claim 32 should read --
connected to the first storage system, the first storage Signed and Sealed this
Seventh Day of February, 2012

David J. Kappos
*Director of the United States Patent and Trademark Office*